United States Patent
Eilertsen

(10) Patent No.: US 11,341,850 B2
(45) Date of Patent: May 24, 2022

(54) ROAD TRAFFIC NAVIGATION SYSTEM

(71) Applicant: Roger Andre Eilertsen, Askim (NO)

(72) Inventor: Roger Andre Eilertsen, Askim (NO)

( * ) Notice: Subject to any disclaimer, the term of this patent is extended or adjusted under 35 U.S.C. 154(b) by 0 days.

(21) Appl. No.: 17/254,149

(22) PCT Filed: Jun. 14, 2019

(86) PCT No.: PCT/NO2019/000017
§ 371 (c)(1),
(2) Date: Dec. 18, 2020

(87) PCT Pub. No.: WO2019/245375
PCT Pub. Date: Dec. 26, 2019

(65) Prior Publication Data
US 2021/0209946 A1 Jul. 8, 2021

(30) Foreign Application Priority Data

Jun. 18, 2018 (NO) .................................. 20180845
Nov. 29, 2018 (NO) .................................. 20181536

(51) Int. Cl.
*G08G 1/0967* (2006.01)
*G08G 1/01* (2006.01)
(Continued)

(52) U.S. Cl.
CPC ..... *G08G 1/096783* (2013.01); *G08G 1/0116* (2013.01); *G08G 1/0133* (2013.01);
(Continued)

(58) Field of Classification Search
CPC .......... G08G 1/096783; G08G 1/0116; G08G 1/0133; G08G 1/096827; G08G 1/096844; G08G 1/0969
See application file for complete search history.

(56) References Cited

U.S. PATENT DOCUMENTS

| 5,906,654 A | * | 5/1999 | Sato | ................. G08G 1/096844 |
| | | | | 701/418 |
| 2002/0040270 A1 | * | 4/2002 | Kwak | ............. G08G 1/096775 |
| | | | | 701/532 |

(Continued)

FOREIGN PATENT DOCUMENTS

EP      0 644 518     3/1995

OTHER PUBLICATIONS

Rashidi, M., et al., "Placement of Road Side Units For Floating Car Data Collection In Highway Scenario," *Ultra Modern Telecommunications And Control Systems and Workshops, 4th International Congress*, Oct. 3, 2012.

(Continued)

*Primary Examiner* — Mohamed Barakat
(74) *Attorney, Agent, or Firm* — Morse, Barnes-Brown & Pendleton, P.C.; Sean D. Detweiler, Esq.

(57) ABSTRACT

A traffic navigation system includes a plurality of navigation terminals located in associated vehicles, which plurality of navigation terminals is in communication with a navigation server system. The traffic navigation system is especially related to a traffic navigation system providing dynamic traffic routing based on traffic related information received from a plurality of Road Side Units (RSUs).

15 Claims, 4 Drawing Sheets

(51) Int. Cl.
  *G08G 1/0968*  (2006.01)
  *G08G 1/0969*  (2006.01)
(52) U.S. Cl.
  CPC ..... *G08G 1/0969* (2013.01); *G08G 1/096827*
       (2013.01); *G08G 1/096844* (2013.01)

(56) References Cited

U.S. PATENT DOCUMENTS

2006/0167616  A1      7/2006   Yamane et al.
2014/0052374  A1*    2/2014   Hoch ..................... A61B 5/18
                                                             701/533
2017/0372608  A1*  12/2017   Sugimoto ............ G08G 1/0112
2018/0053405  A1*    2/2018   de Azevedo ......... G08G 1/0112
2019/0096238  A1*    3/2019   Ran ...................... G08G 1/0968
2019/0311616  A1*  10/2019   Jin ................... G08G 1/096783

OTHER PUBLICATIONS

International Search Report, International Application No. PCT/N02019/000017, dated Sep. 10, 2019.

* cited by examiner

ROAD TRAFFIC NAVIGATION SYSTEM

RELATED APPLICATIONS

This application is a national stage filing under 35 U.S.C. 371 of International Application No. PCT/NO2019/000017, filed Jun. 14, 2019, which claims priority to Norway Application No. 20180845, filed Jun. 18, 2018 and Norway Application No. 20181536, filed Nov. 29, 2018. The entire teachings of said applications are incorporated by reference herein.

FIELD OF THE INVENTION

The present invention is related to a traffic navigation system comprising a plurality of navigation terminals located in associated vehicles, which plurality of navigation terminals is in communication with a navigation server system, wherein the system is specially related to a traffic navigation system providing dynamic traffic routing based on traffic related information received from a plurality of Road Side Units (RSUs).

BACKGROUND OF THE INVENTION

Modern vehicles are changing their appearance from petrol driven speed monsters to electric and environmentally friendly computer driven machines. Many modern vehicles need software updates from time to time provided over the Internet instead of changing oil from time to time at workshops. In a sense, many modern vehicles are computers equipped with wheels and an electric motor.

Despite the "modernity" of new vehicles, one problem remains despite the new technology, and that is the number of vehicles on the roads.

Cities has evolved with an infrastructure with constraints inherited from city development from as far back in time as the antique. Modern city planning and modernization has improved the situation. However, the main traffic problem due to huge number of vehicles is of course congestions of vehicles on the roads that may block traffic for hours.

The Google map system has the capability of receiving GPS (Global Positioning System) data updates sent from GPS transceivers in vehicles to a server maintaining Google maps indicating traffic situations by coloring roads according to a measured traffic level based on GPS reading from vehicles on the roads. For example, blocked roads can be visualized in red. A Google map section of a specific geographical area can be viewed in an Internet browser in a computer device located for example in vehicles. Based on the received data, Google maps can provide visual indications in maps of respective traffic levels on roads helping drivers to select routes outside areas with traffic congestion. The google map solution will identify the problem with a queue when it starts to develop, for example due to an accident on the road, but this will only manifest itself in the Google map after a time period has lapsed. The traffic situation displayed in the map is the result of a post processing after the data has been received by the Google server system. In a sense, this will always be "old" data.

When drivers sees the situation above in the Google map displayed in the driver's vehicle, the driver will select an obvious road around the problematic area. Other vehicles arriving at the same location using Google map will also probably choose the obvious road around the problem. A reason for a traffic congestion is a large number of vehicles on a road. When a queue starts to emerge, a larger number of vehicles may try to get around the problem by choosing the obvious road around the problem, and the larger number of vehicles will probably cause traffic congestion on the obvious road chosen around the problem. Therefore, post processing of traffic related data may not solve the traffic problem itself, but most probably move the problem to other locations of the road system.

The Internet as a communication infrastructure provides a possibility to communicate with vehicles from traffic control centers having an overview of the traffic situation in a city for example. Guidance and advice related to traffic problems provided to road users online can mitigate for example developments of ques in respective areas of a city. In addition, traffic control centers may have to its disposition software running advanced mathematical models of traffic as such, which can improve respective guidance and advice given by the traffic control center. It is important to get reliable forecasts of traffic developments before congestions happens. In the future, it is probable that such traffic control centers can operate without human intervention and in combination with for example self-driven vehicles, elimination or at least mitigation of the problem with traffic congestion is probable.

However, the information a traffic control center can provide is related to areas of a city for example. The information will therefore rarely be related to a road segment with less traffic. If a truck traveling on this road segment is having motor problems, a congestion will probably not evolve and the incident passes unnoticed to for example the traffic control center. This may instead be a problem for a single vehicle entering the road, which may be blocked by the truck. Drivers usually follow main roads when travelling. However, if a driver is using a prior art navigation tool, the navigation tool calculate the shortest route between a starting point to a destination point chosen by the driver. Everyone using navigation tool has the experience that the navigation tool can choose routes via the most obscure side roads, and hence lead a driver via roads with less traffic. When such a road is blocked the driver may end up with a severe problem related to the time the driver will use to reach the destination.

Vehicles of any kind do not only use navigation tools, but cyclists and pedestrians are also frequent users of navigation tools. Blocked roads can also stop cyclists and pedestrians.

In this context, measurement of traffic conditions and traffic development is mandatory to achieve control of traffic flow and achieve reliable traffic forecasts, even on side roads with less traffic.

The marriage of sensing, analysis, control, and communication offers a promise of realizing a Smart City concept through Intelligent Transportation Systems (ITS). Employing Intelligent Roadside Units (RSUs) may help smooth traffic flow, improve safety and emergency responses, and provide additional services to road users as well as pedestrians.

The article "Placement of Road Side Units for Floating Vehicle Data Collection in Highway Scenario" by Rashidi, Maryam; Batros, Iulian; Madsen; Tatiana Kozlova; Riaz, Tahir; Paulin, Thomas published in: "Proceedings of IV International Congress on Ultra-Modern Telecommunications and Control Systems" 2012 DOI (link to publication from publisher) 10.1109/ICUMT.2012.6459649 disclose how vehicle data has been used to collect traffic state information from a set of individual vehicles. The vehicles are equipped with On Board Units (OBU) that collect different measurements and the vehicle position and transmit the data to a remote control center. The investigation reveals that to obtain perfect coverage, a larger number of RSUs must be located along roads, which implies that this solution is a costly solution.

Information submitted from vehicles via RSUs can include for example speed of the vehicle, an indication if the window wipers are on (indicating rain), an indication if brakes are active, measurement of road friction conditions etc. In return, the RSU can inform other approaching drivers about road friction conditions around the geographical position of the RSU, weather information (weather forecasts), and traffic flow conditions etc.

One aspect is to measure respective relevant parameters of the traffic and road conditions etc. On the other hand, this information should result in proper traffic guidance and routes from navigation tools provided online to respective vehicles, cyclists and pedestrians.

An aspect of the present invention is to combine traffic information like information from RSUs and other online traffic information sources, like road traffic centrals etc. with navigation tools carried by pedestrians or cyclists as well as navigation terminals located in vehicles. If a user is utilizing an automated navigation tool, the navigation program is normally configured to consider the shortest distance between a starting point and a destination point. Therefore, integrating traffic information about traffic flow on respective routes calculated in a navigation tool will provide a probable shortest travel time compared to traveling a shortest distance on roads having traffic flow problems.

Further, a navigation advice should take into account not only present traffic flow condition of a road, but also factors as traffic capacity of the road, parking capacity at destinations etc. If a navigation system knows respective selected destinations of other drivers, this should be taken into account when providing an advice of using specific roads etc.

The present invention do not only calculate a shortest route between a selected starting point and a selected destination point. Traffic situations or traffic state is taken into consideration current traffic situation, which result in a re-calculation of shortest routes by providing a probable shortest travel time between a selected starting point and destination point.

Therefore, navigation planning and navigation advice is in fact a dynamic process driven by ongoing traffic development and traffic pattern changes, which a navigation tool should take into consideration when calculating routes.

Therefore, it is a need of an improved navigation system. Especially a navigation terminal located and associated with respective vehicles, cyclists and pedestrians, where in live traffic data is used to determine a new route, changing an ongoing travel along an already calculated route, and providing optional advice of available parking locations etc.

OBJECT OF THE INVENTION

It is a further object of the present invention to provide an alternative to the prior art.

In particular, it may be seen as an object of the present invention to provide a navigation system comprising a navigation terminal configured to take into account traffic related data when navigation routes are calculated between a starting point and a destination point.

SUMMARY OF THE INVENTION

Thus, the above described object and several other objects are intended to be obtained in a first aspect of the invention by providing a navigation system comprising a navigation server system in communication with multiple navigation terminals located in vehicles, and associated with respective vehicles, The present invention is providing a navigation system comprising a navigation server system in communication with multiple navigation terminals located in and associated with respective vehicles, the respective navigation terminals are at least configured to calculate routes between a selected starting point A, and a selected destination point B using a computer coded map downloaded from the navigation server system, wherein the route calculation takes into account traffic information received from multiple Road Side Units (RSUs) allocated along a calculated route, wherein the locations of RSUs in the map are indicated with their respective Global Positioning System coordinates (GPS) in an information layer downloaded from the navigation server system, which is superimposed on the computer coded map residing in the navigation terminal, each respective navigation terminal is configured to repeatedly read out GPS positions from a GPS transceiver located in the navigation terminal, wherein the repeatedly read out GPS positions are plotted into the map of the navigation terminal, the navigation terminal is further configured to transmit the repeatedly read out GPS positions to the navigation server system together with an identification of the navigation terminal, thereby the navigation server system keeps tracks of all moving navigation terminal inside a geographical area the navigation server system is configured to serve, the navigation terminal is further configured to detect if the navigation terminal is approaching, or is passing one of the RSU positions located in the map, and to submit data comprising at least the speed of the vehicle when the navigation terminal is within a defined distance from the RSU, or is passing the RSU, the navigation terminal is further configured to signal the navigation server system when a navigation terminal has reached a selected destination, wherein the navigation server system deletes the recorded track associated when the navigation terminal is signalling the event of reaching the destination, thereby the navigation server system keeps tracks of vehicles that is supposed to be moving towards selected destinations.

Respective aspects of the present invention may each be combined with any of the other aspects. These and other aspects of the invention will be apparent from and elucidated with reference to the embodiments described hereinafter.

The traffic navigation system of the present invention will now be described in more detail with reference to the accompanying figures. The accompanying figures illustrates an example of embodiment of the present invention and is not to be construed as being limiting to other possible embodiments falling within the scope of the attached claim set.

DETAILED DESCRIPTION OF AN EMBODIMENT

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. The mentioning of references such as "a" or "an" etc. should not be construed as excluding a plurality. The use of reference signs in the claims with respect to elements indicated in the figures shall also not be construed as limiting the scope of the invention.

Furthermore, combining individual features mentioned in different claims may be advantageously, and the mentioning of these features in different claims does not exclude that a combination of features is not possible and advantageous.

Figure 1A:
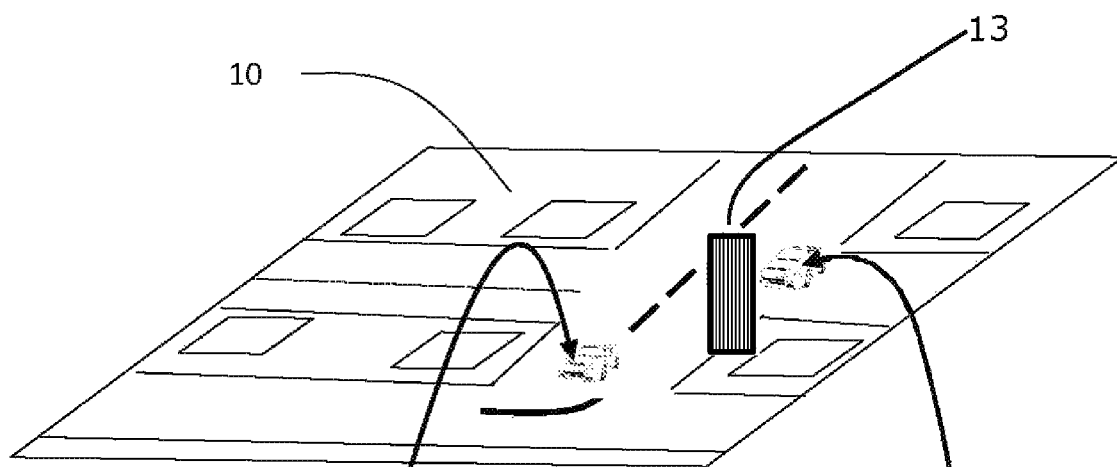
FIG. 1a and FIG. 1b illustrate an example of an aspect of the present invention.
Figure 1B:
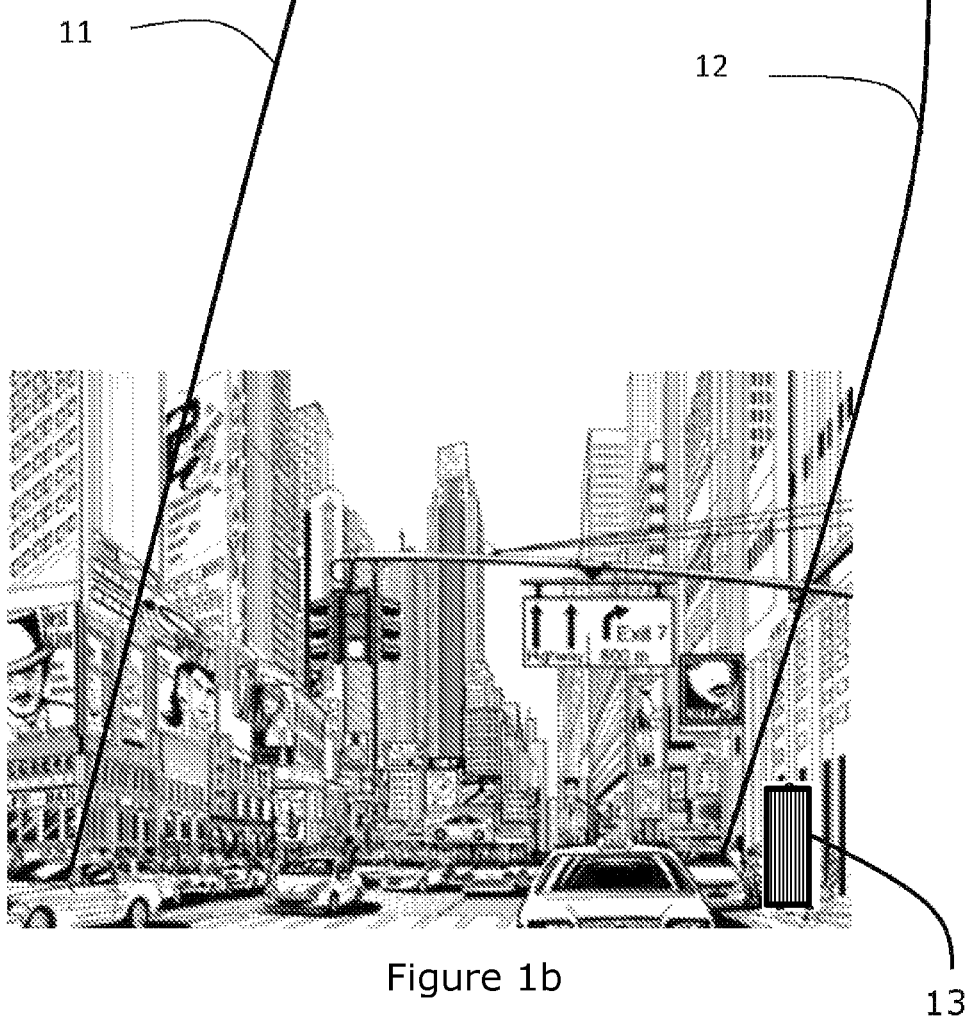

FIG. 1a and FIG. 1b illustrate the relationship between moving vehicles and positions in a map 10. Vehicles driving on a street can submit their GPS (Global Positioning System) positions to a computer system updating respective GPS positions in a computer coded version of the map 10 (refer FIG. 1a). The respective GPS positions 11, 12 can be submitted to the computer system according to different communication protocols. The readout of GPS positions can be done on a regular basis thereby vehicle movements can be tracked and visualized on roads in the computer coded version of the map 10. This is a common known technique used for example by Google maps.

A roadside unit (RSU) 13 is illustrated located on a side of one of the streets in the illustrated city view in FIG. 1b.

The geographical position (GPS position) of the RSU 13 is coded into the computer-coded map 10 and can be visualized with a symbol as illustrated in FIG. 1a. There is of course multiple RSUs located on the physical ground as well as in the computer coded map 10. Just to simplify the description, FIG. 1a and FIG. 1b illustrates just one RSU 13.

The computer system can be configured to track positions of vehicles, and can be configured to measure respective distances between a vehicle and a RSU 13. When the distance between a vehicle and a specific RSU 13 is below a defined threshold, the computer system can be configured to read out information from the vehicle. The measurement of a distance between a specific vehicle and a specific RSU 13 is done by only using the GPS positions updated in the computer-coded map.

What if the physical RSU 13 is not present on the ground, but exist only as a symbol in the map 10? This will function the same way. The physical RSU 13 is then replaced by a virtual RSU 13 only visualized in the map 10 on a position defined by GPS coordinates identical to the position a physical RSU would have been located on the ground.

An aspect of this feature is that respective GPS positions of RSUs coded as symbols into a computer-coded map may comprise physical RSUs as well as virtual RSUs.

A system detecting approaching vehicles towards an RSU, or the vehicles is passing the RSU, can start reading out data from the identified approaching or passing vehicle. The data can be submitted to server system keeping track of data, calculating traffic flow parameters etc.

Figure 2:
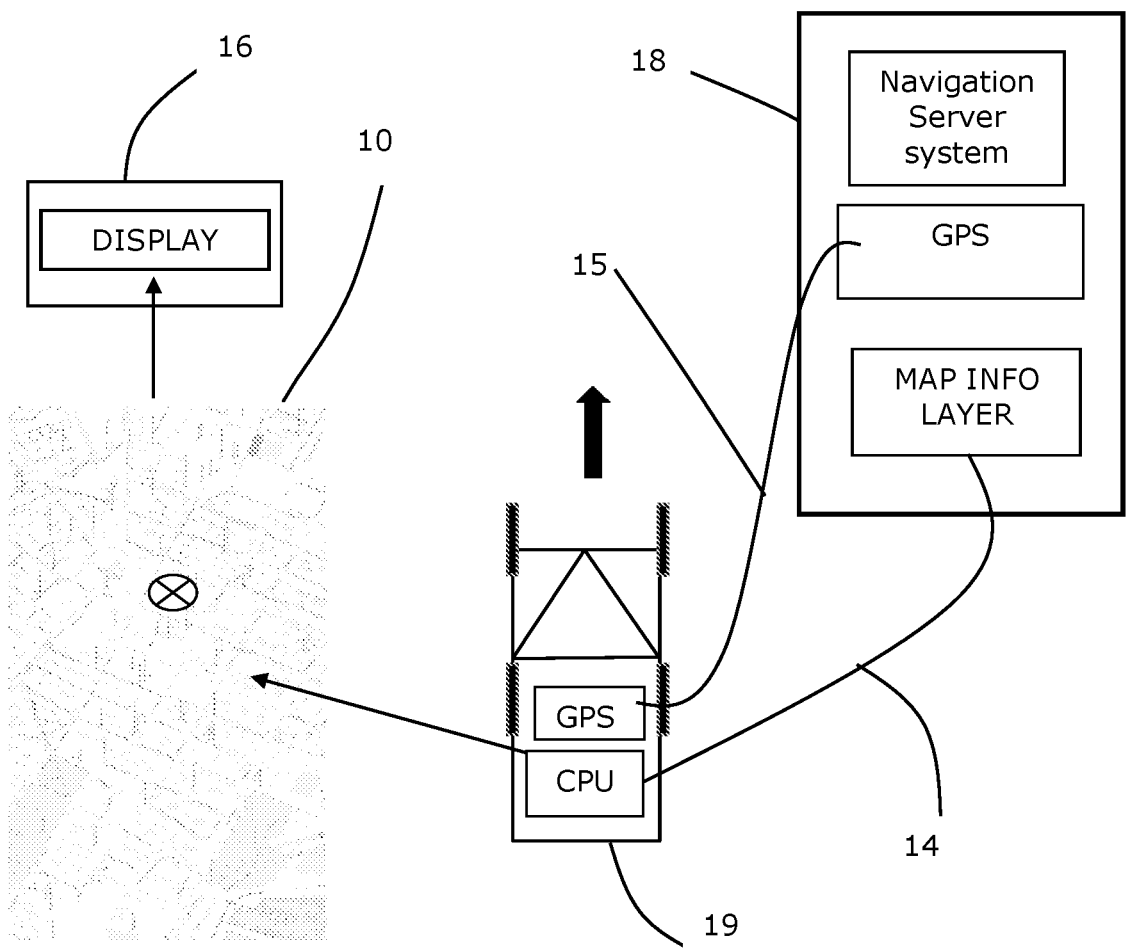
FIG. 2 illustrate an example of embodiment of the present invention.

An example of embodiment of the present invention is disclosed in FIG. 2. The example comprises a navigation server system 18 in communication with a vehicle 19 comprising a navigation terminal according to the present invention. The navigation server system 18 supports a plurality of vehicles (vehicles, trucks, busses etc.), cyclist and pedestrians equipped with a navigation terminal according to the present invention. For example, a smart phone can serve as a navigation terminal, wherein an application program is running in the smart phone configuring the smart phone to functioning as a navigation terminal according to the present invention.

In FIG., 2 a vehicle 19 is illustrated having a computer system comprising Central Processing Unit (CPU) executing instructions of the application program of the navigation terminal. In addition, a GPS transceiver is located in the vehicle 19, which GPS transceiver is in communication with the CPU. A computer-coded map 10 is downloaded into a memory (not illustrated) in the computer system of the vehicle 19. The navigation terminal comprises a display 16, which can visualize the map 10. The navigation terminal can further be configures to read out GPS positions repeatedly from the local GPS transceiver inside the vehicle 19 and plotting a trajectory defined by the repeatedly read out GPS positions in the map 10. As illustrated in FIG. 2, the repeatedly read out GPS positions can also be transmitted 15 to the navigation server system 18.

The navigation server system 18 comprises a map library including a library of map information layers. When a user starts up the navigation terminal inside the vehicle, or is starting a smart phone serving as the navigation terminal, the current GPS position of the vehicle or smart phone is by default transmitted to the navigation server system 18. The navigation server system is configured to respond by downloading a map section 10 covering a substantial geographical area around the initially submitted GPS position to the vehicle or smart phone that initiated the downloading by transmitting the initial GPS position. The navigation terminal is configured to transfer 17 the map 10 to the display 16 that visualize the map 10, or a zoomed in or out section of the map 10.

In addition to the map section 10, respective map information layers can be downloaded to for example the navigation terminal in the vehicle 19 in FIG. 2. Map information layers can be superimposed on top of the map image displayed on the display 16, for example.

A map layer can comprise positions of physical as well as virtual RSUs as discussed above. In this manner, the navigation terminal in respective vehicles and smart phones (the app) can be configured to track themselves as discussed above, and can be configured to identify if the computer in the vehicle or smart phone is approaching a RSU located in the map information layer. When the distance to a RSU is below a defined threshold, the navigation terminal is configured to transmit vehicle data to the navigation server system 18. If a pedestrian or cyclist is using a navigation terminal, the navigation terminal can be configured to prompt the pedestrian or cyclist to answer some traffic related questions.

When a navigation terminal is moving outside geographical limits of a downloaded map section 10 and/or information layer, the navigation terminal is configured to request a new download of a further map section 10 and/or information layer.

When a navigation terminal is initialized to be part of the navigation system of the present invention, a driver, cyclist or pedestrian register as a user of the navigation server system 18. When a vehicle associated with a driver is tracked by the system, i.e. GPS positions is sent to the navigation server system 18, the real identity of the driver is kept hidden. When the driver register, a unique fake identity is created by the system that will be used when tracking the associated navigation terminal of the vehicle. In the same manner, it is not possible to read out any registration number of tracked vehicles in respective maps. The number plate is also associated with a fake number plate. The user when registering does an association between a real identity and a fake identity. Only the navigation server system is configured to perform a reverse lookup.

One of the typical parameters submitted via a RSU is the speed of the approaching or passing vehicle.

When a plurality of approaching or passing vehicles has submitted velocity data via RSUs located along a road segment, the navigation server system receiving the velocity data can calculate average speed of vehicles along the road segment and is then capable of estimating traffic flow condition on this specific road segment. If the traffic flow measurements indicate slow traffic, this situation can be reported to respective navigation terminals of vehicles driving inside a geographical area around the problematic road segment.

Whenever a navigation terminal is calculating a route, the starting point and destination is reported to the navigation server system by the navigation terminal. When the navigation terminal moves, respective GPS positions is updated in the computer coded map 10 as discussed above. The submitted GPS positions is recorded with an association to the fake, but unique, identity of the associated vehicle. When the vehicle or navigation terminal reaches the destination, the route is deleted from the navigation server system. While respective tracks are "live", i.e. the respective vehicles are moving towards respective destinations, the navigation terminal is capable at any time to identify which vehicles will probably end up on an identified problematic road. The navigation server system can then via the recorded fake identities be able to find an associated network address of each navigation terminal and can send proposals to each navigation terminal of alternative routes. Since the navigation terminal has an overview of the moving vehicles, the advice of alternative routes can also be used to distribute respective vehicles onto different routes around the problematic road segment. Since only "live" tracks are available at any time, the advice of alternative routes will always be relevant advices.

When there are few vehicles on the road, for example due to a situation wherein few vehicles has turned on their navigation terminals, a single vehicle can be used to make a probable accurate measurement of traffic flow on road segments. According to an aspect of the present invention, a navigation terminal can be configures to be a moving RSU. When the vehicle with the moving vehicle is moving, the navigation terminal is configured to transmit the associated vehicle's velocity to the navigation server system on a regular basis. Based on the sampled velocity data along a road segment, the average velocity will provide a probable correct traffic flow measurement of the road segment.

There can be some exceptions to this rule. If a vehicle stops moving the reason can be a signal that there is a queue, or the vehicle is parked. In such situations, the navigation terminal detects that the GPS values stops changing, or is changing very slowly. In such circumstances the navigation terminal is configured to ask the driver of the vehicle to confirm one of three options: a) there is a ques, b) the vehicle is parking, or c) there is a temporary stop due to for example when a truck is backing out into the street from a building site. The driver's qualification is sent to the navigation server system noting the submitted situation for further notification to other vehicles probably entering the same road segment.

The concept of a moving RSU does not rule out the possibility that the navigation server system receives velocity measurements from other vehicles on a same road segment a moving RSU is operating.

Another aspect of the present invention is that for example a driver can place virtual RSUs in the computer code map residing in the navigation terminal of his vehicle. The display 16 in communication with the navigation terminal of vehicle 19 in FIG. 2 can have a touch sensitive surface enabling the driver of the vehicle 19 to position at least one virtual RSU by touching the display surface on the desired location. The position of the extra RSU(s) is added to the information layer downloaded from the navigation server system 18. The navigation server system is configured to identify other vehicles being "live" in a geographical area around the extra RSU(s) and is updating the information layer in the respective identified vehicles. The updated information layer comprising location of all RSUs in the area is then configured to receive data from approaching or passing vehicles. In this manner, it is possible for a driver to locate areas of specific interest and receive relevant traffic information from this area of interest. For example, the navigation server system 18 can be configured to submit data directly to the navigation terminal of the driver from the extra RSUs.

An alternative is that the navigation server system for example establishes a voice communication channel between an approaching or passing vehicle and the driver requesting the extra RSUs. The navigation server system can find the fake identities of the parties of the voice channel, and based on the associated network addresses of the navigation terminal, a voice channel over the network can be established and traffic assessment qualified by human observations can be exchanged.

The extra RSUs will only be "live" for a defined shorter time period. When the defined time period lapses, the extra RSUs are removed from the respective downloaded information layers. In this manner the information layers will not comprise too many RSUs at any time.

Figure 3:
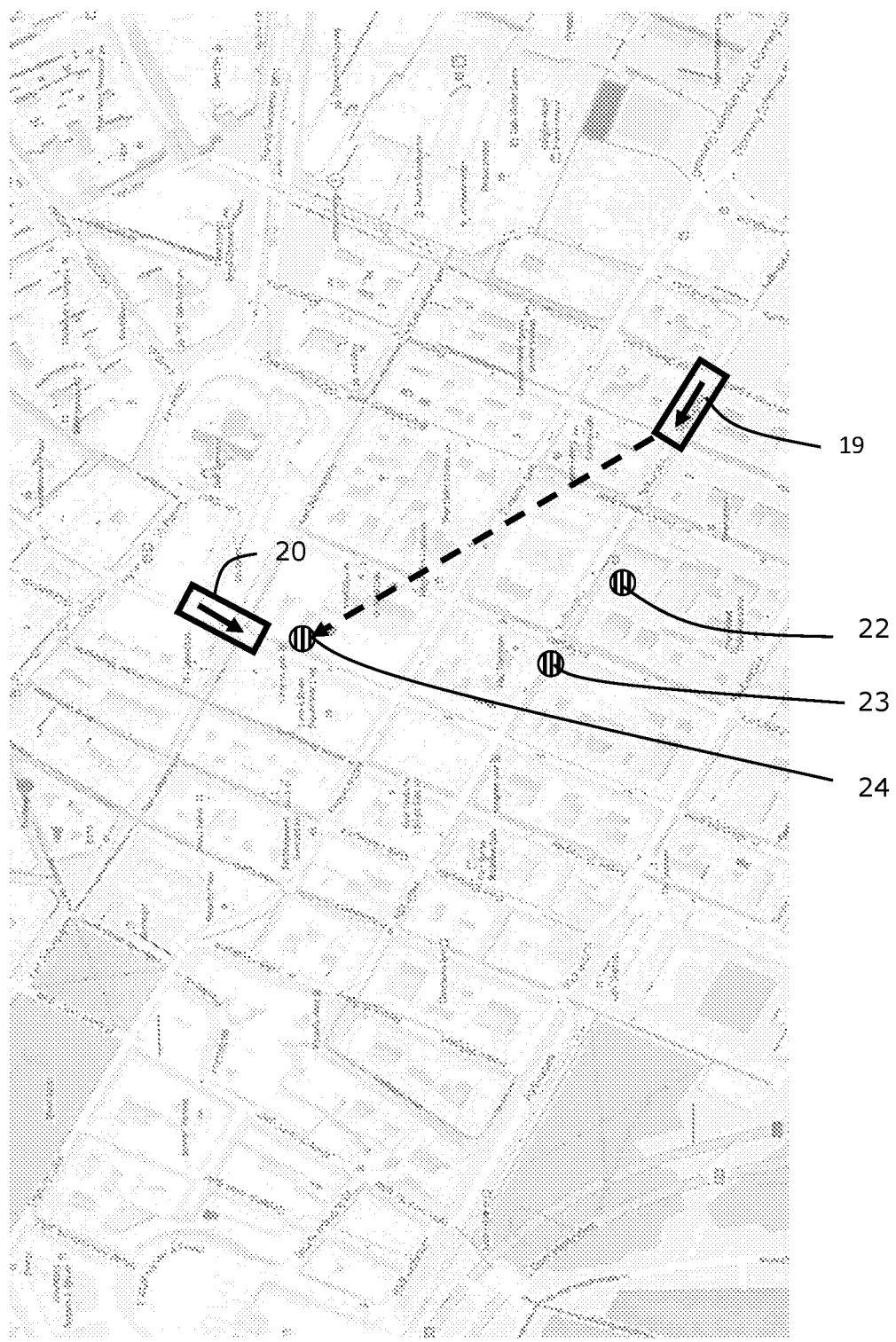
FIG. 3 illustrate further details of the example of embodiment illustrated in FIG. 1a and FIG. 1b.

FIG. 3 illustrate an example of using a navigation terminal according to the present invention. In this example, a vehicle 19 is driving without actually using a route proposal to a destination. Very often destinations are the same destination almost every day. For example, driving to the workplace each morning is a common situation. In a sense, it is not necessary with a navigation tool as such to drive to the same destination almost every day. Anyhow, the navigation terminal can be active without actually doing route calculations. The GPS position of the vehicle is plotted into the map section 10 residing in the navigation terminal as well as an information layer comprising positions of RSUs. Therefore, feedback from the navigation server system receiving traffic related data from the respective RSUs can be submitted to the navigation terminal without actually being active calculating a route.

The traffic information can be sent to drivers as text messages being displayed on a display of the navigation terminal, or as a voice message sent over a network connection established between the navigation terminal and the navigation server system.

An aspect of the present invention is that a user may download specific routes as part of a user profile. For example, his preferred route to his workplace is stored. When starting from home, the driver activates his route to work and the navigation server system downloads for example an information layer as illustrated in FIG. 3 superimposed on the map section 10.

The work place is just indicated with an arrow and there is located RSUs 20, 21, 22, 23, 24 along the usual route. The RSU 20 is located close to his workplace. If the driver receives information that there is a traffic congestion around RSU 23 for example, the driver can choose another route around the position of RSU 23, or the driver can activate the calculation of a route that optimize the travel time from the current position when activating the routing and to the workplace.

In the situation described above it is possible to activate the routing without really following the calculated route. If the driver spots an incident that has not yet been recorded by the navigation server system, the driver can deviate from the calculated route to avoid a possible problem. It is common that the navigation routine detects this incident and starts to reroute from the new position towards the destination. The benefit is that the new calculation finds the shortest route from the new starting point.

With reference to for example FIG. 3, the distance between respective RSUs 20-24 can be uneven taking into account for example only historical data related to traffic conditions. If historical data indicates that a specific road has less traffic, it is not necessary to have many RSUs along this road. If the historical data indicates that between specific hours of the day the traffic is high, a navigation server system according to the present invention can be configured to increase the number of RSUs during these hours.

In some situations, for example when there is a football match, it is known that many people will drive towards the same destination within a time window leading up to the start of the game. This situation is also typical when driving towards an airport. An airport is also a busy location with many vehicles arriving and departing, and people need to arrive within a defined hour or else they might miss a flight.

Generally, the navigation system according to the present invention can be given a destination selected by a driver and a time when the driver needs to, or wishes to, be at the destination.

Based on provided arrival times at locations, for example an airport or a stadium etc. the navigation server system is configures to identify time slots wherein the traffic towards a specific destination will comprise a large number of vehicles. Based on this information, the navigation server system is configured distribute available road capacity among all vehicles based on their required arrival time. The navigation server system may establish a queue of cars ordered in a sequence given by their required destination times. The fastest roads towards the destination is allocated to the vehicles in the front of the sorted queue etc.

Another aspect of situations wherein many cars are approaching a same location is the available capacity of parking lots. The navigation server system can be informed of the number of available parking lots around a location like a stadium or an airport.

When vehicles are arriving, the navigation server system can deduct one parking lot for each arriving vehicle from the total number of available parking lots. The navigation server system is therefore capable of estimating parking capacity at any time, and at which hour the capacity probably will be exhausted. This information can be used by the navigation server system when distributing road capacity among vehicles by providing allocation of routes to main parking lots as well as reserve parking lots etc. located in adjacent neighborhoods of the destination. If the destination is an airport, departure times of shuttle busses allocated to respective parking spaces can part of the communication to the drivers.

Supermarkets can experience a same situation with parking lots, and the scheme outlined above can be adapted and used to direct vehicles towards main and reserve parking lots associated with the supermarket.

In an example of embodiment of the present invention, a navigation terminal is configured to prompt a driver for a destination if the navigation terminal detects that the vehicle starts moving (changing GPS readings) without a selected destination. The prompting can be to ask the deriver if he will drive along a previous recorded route, for example to the work place, or if the destination is an airport etc. and the question can also be qualified with some information about the traffic situations at some specific locations, for example an airport.

Figure 4:
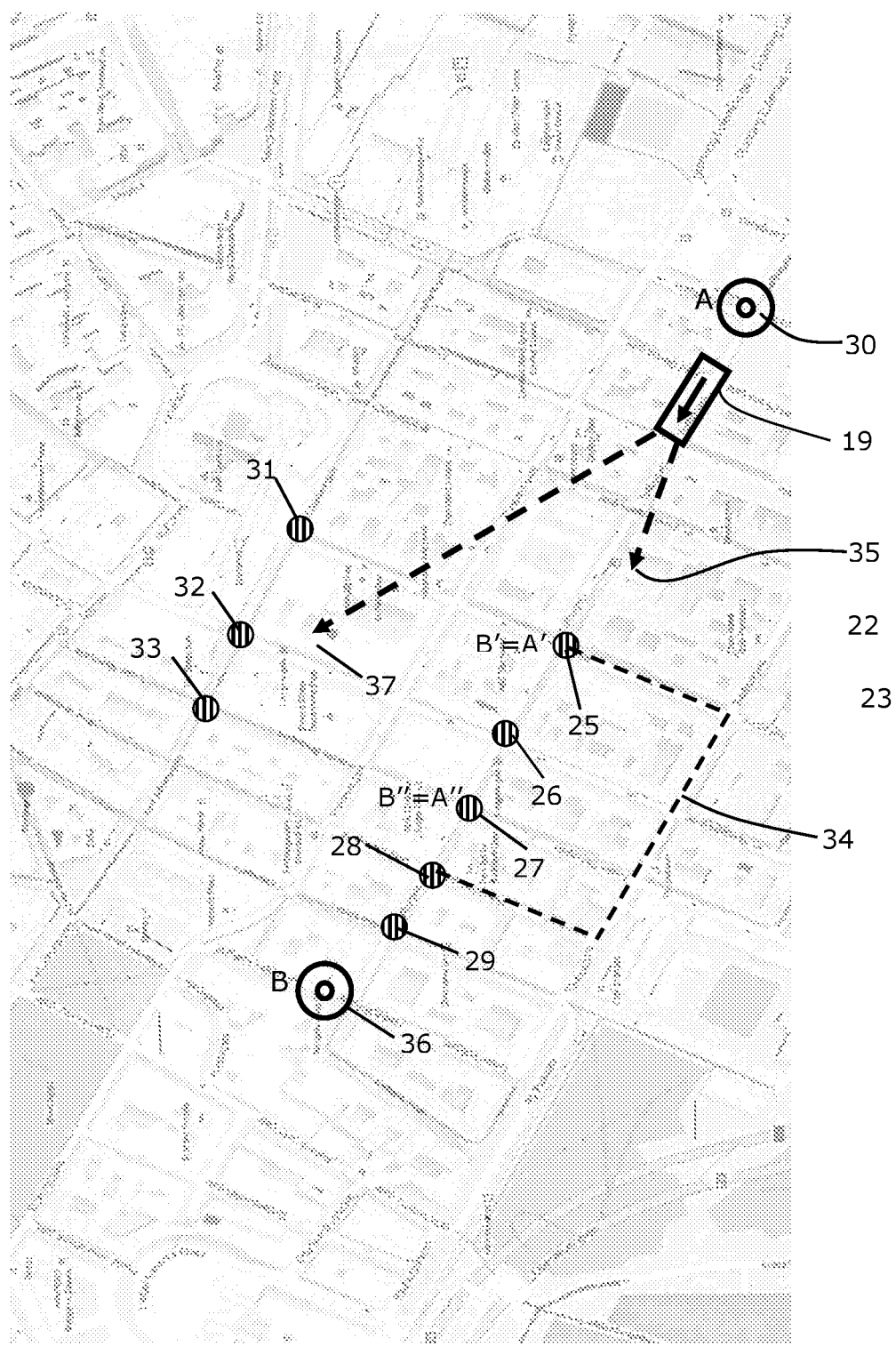
FIG. 4 illustrate further aspects of the present invention.

FIG. 4 illustrate a situation wherein calculations of routes is part of the use of a navigation terminal according to the present invention. A complicating factor with respect of providing a route for a vehicle is that on the time of calculating the route and taking into account traffic conditions, the conditions can change during the travel since it takes some time to travel from a starting point to a destination point. During the travel, the traffic situation can change ahead of the vehicle, which may imply a rerouting of the route.

An aspect of the present invention is that almost any available commercial navigation program can be integrated with the system provided in a navigation terminal according to the present invention. The only requirement is that the navigation program has an Application Program Interface (API), which allow transmission of GPS positions of locations selected on a touch sensitive display. Transmitting GPS positions from a navigation server system must also be possible. Most available navigation programs has such API solutions.

FIG. 4 illustrate a use of the navigation terminal with active routing solving the problem of dynamical changes of traffic situations while driving.

A car 19 is starting at point A 30 and is driving towards a destination point B 36. The illustration is a simplified situation made just for illustrative purposes. The navigation terminal has calculated the shortest possible route between the starting point A and the destination B. Respective RSUs 25 to 29 located along the calculated route is monitoring traffic situations along the calculated route.

At the location 35, there is a reported incident reported to the navigation server system. The navigation server system reports the incident to all navigation terminals being located inside adjacent areas. There is also some side roads crossing the calculated route. There is located three RSUs 31, 32, 33 in junctions located on the crossing streets. The locations can been selected due to historical reasons. It may be that most of the traffic entering these crossing side roads actually enters the side rods in these junctions and is therefore a preferred location to monitor traffic both in an out of the respective side roads. If there should be a congestion in a road along the calculated route, a rerouting could be using one of these crossing side roads. In FIG. 4, such a situation is illustrated. The route alternative 34 is an example of a rerouting towards the destination B due to a congestion on the road segment of the calculated route starting from RSU 25 and ending in RSU 28. The alternative route 34 starts from RSU 25 and ends in RSU 28.

All the RSUs are located in junctions in this example.

The navigation terminal first calculate the shortest route between the starting points a 30 and the destination 36 B. Then the calculated route is segmented into sub routes. In the example disclosed in FIG. 4 a first sub route is calculated from the starting point A 30 down to the RSU 25 denoted B', i.e. a temporary destination B'. Along this route, the navigation terminal receives traffic information regarding the road segment from the navigation server system. The traffic data can have been collected by RSU 25 as discussed above. If the route is ok seen from a traffic flow perspective, the navigation tool leaves the original calculated route intact. The next step is to route again a new sub segment of the calculated route. This will happen after a time has elapsed due to the travel time from the starting point A 30 to the RSU 25. The next road segment to be calculated starts from a new starting point A' which is equal to the destination point B' used in the previous calculation. The next sub segment is calculated for a segment starting in A' and ending in a new destination B". If everything is ok seen from a traffic flow perspective, the original calculated route is kept. However, in this example RSU 27 has reported a possible congestion of traffic on the road segment A' to B". The routing is then calculated as if the road segment between A' and B" was not present. The new calculated route follows the deviation 34. When arriving at B" a next segment between B" equal a new starting point A" is calculated wherein the road segment ends in the destination B 36.

The criteria for the segmentation can be a segmentation according to a selected length of a sub segment of the calculated route. Another criterion can be a target for a travel time. The navigation server system can be configured to estimate travel time on different segments by taking into account measured traffic flow values on the specific road segments. If a road segment is slow, an alternative route is calculated.

An aspect of the present invention is to locate at least one RSU at selected destinations. Sometimes it can be many roads leading into a destination, for example in a city. Then it can be of interest to identify which roads leading into the destination as the least traffic. Otherwise, one can risk being trapped in the traffic only a few hundred meters from the final destination.

According to an example of embodiment of the present invention, a navigation system comprising a navigation server system in communication with multiple navigation terminals located in and associated with respective vehicles, the respective navigation terminals are at least configured to calculate routes between a selected starting point A, and a selected destination point B using a computer coded map downloaded from the navigation server system, wherein the route calculation takes into account traffic information received from multiple Road Side Units (RSUs) allocated along a calculated route, wherein the locations of RSUs in the map are indicated with their respective Global Positioning System coordinates (GPS) in an information layer downloaded from the navigation server system, which is superimposed on the computer coded map residing in the navigation terminal, each respective navigation terminal is configured to repeatedly read out GPS positions from a GPS transceiver located in the navigation terminal, wherein the repeatedly read out GPS positions are plotted into the map of the navigation terminal, the navigation terminal is further configured to transmit the repeatedly read out GPS positions to the navigation server system together with an identification of the navigation terminal, thereby the navigation server system keeps tracks of all moving navigation terminal inside a geographical area the navigation server system is configured to serve, the navigation terminal is further configured to detect if the navigation terminal is approaching, or is passing one of the RSU positions located in the map, and to submit data comprising at least the speed of the vehicle when the navigation terminal is within a defined distance from the RSU, or is passing the RSU, the navigation terminal is further configured to signal the navigation server system when a navigation terminal has reached a selected destination, wherein the navigation server system deletes the recorded track associated when the navigation terminal is signalling the event of reaching the destination, thereby the navigation server system keeps tracks of vehicles that is supposed to be moving towards selected destinations.

Further, the navigation terminal is configured to detect when repeatedly read GPS positions is not changing, when such an incident appears the navigation terminal is configured to ask a driver of the associated vehicle to select one of three statement displayed on a display of the navigation terminal:

there is a queue the vehicle is parked it is a temporary stop of the traffic.

Further, the navigation server system is configured to keep track of vehicles moving towards a same destination, wherein the navigation server system distributes available road capacity between the vehicles moving towards the same destination by allocating subsets of roads each respective navigation terminal can use when calculating a route towards the common destination.

Further, the navigation server system is taking into account available parking lots when allocating subsets of roads to respective navigation terminal such that when a first parking location is full, a new subset of roads leading towards a second parking location is transmitted to the respective navigation terminals.

Further, wherein at least one navigation terminal of the plurality of navigation terminals is configures as a moving RSU repeatedly transmitting at least the speed of the associated vehicle to the navigation server system.

Further, a navigation terminal is configures to allow a driver of the associated vehicle to place at least one virtual RSU in the information layer comprising the RSUs allocated by the navigation server system, wherein the location of the RSU is selected in an area of interest to the driver of the vehicle, when the at least one virtual RSU is placed in the information layer, the navigation terminal is configures to transmit a copy of the updated information layer to the navigation server system, the navigation server system is configures to identify vehicles located in adjacent areas of the at least one RSU by searching the recorded tracks of moving vehicles, and is downloading the updated information layers to the identified vehicles.

Further, navigation terminals receiving the updated information layers deletes the updated information layer after a defined time period, and is downloading the initial information layer.

Further, the navigation terminal of the driver locating at least one virtual RSU in the information layer is configured to receive traffic measurements from vehicles approaching or is passing the at least one virtual RSU.

Further, the navigation terminal of the driver locating at least one virtual RSU in the information layer is configured to request the navigation server system to set up a voice channel over a network of the system between one of the approaching or passing cars and the navigation terminal associated with the driver's vehicle.

Further, the navigation terminal is configured to split up a calculated route in a plurality of sub segments, and calculate each sub segment of the calculated route one at a time taking into account traffic situations evolving during the time spent on traveling along previous calculated segments of the calculated route.

The invention claimed is:

1. A navigation system comprising a navigation server system in communication with multiple navigation terminals arranged and associated with respective vehicles,
the respective navigation terminals are at least configured to calculate routes between a selected starting point A, and a selected destination point B using a computer coded map downloaded from the navigation server system,
the route calculation is dynamic and considers traffic information received from multiple Road Side Units (RSUs) controlled by the navigation server,
wherein the locations of a defined number of RSUs in the map are indicated with their respective Global Positioning System coordinates (GPS) in an information layer downloaded from the navigation server system, which is superimposed on the computer coded map residing in the navigation terminal,
the navigation terminals are configured with interactive displays enabling a road user to interact with the navigation terminal, wherein a configured interaction by the road user is to mark GPS positions of extra RSUs at selected GPS positions in the information layer superimposed over the downloaded map,
the navigation terminals are configured to upload the updated information layer to the navigation server, which enables the navigation server system to collect further traffic information from the extra GPS positions of RSUs selected by the road user, which enables the navigation terminal to update the dynamic route calculations according to the road user's selection of extra GPS positions of extra RSUs.

2. The system of claim 1, wherein the navigation terminals are configured to detect when the GPS position repeatedly read out is not changing, when such an incident appears the navigation terminal is configured to ask a driver of the associated vehicle to select one of three statements displayed on a display of the navigation terminal:
there is a queue,
the vehicle is parked,
it is a temporary stop of the traffic.

3. The system of claim 1, wherein the navigation server system is configured to keep track of vehicles moving towards a same destination, wherein the navigation server system distributes available road capacity between the vehicles moving towards the same destination by allocating subsets of roads each respective navigation terminal can use when calculating a route towards the common destination.

4. The system of claim 3, wherein the navigation server system is further configured to consider available parking lots when allocating subsets of roads to respective navigation terminal such that when a first parking location is full, a new subset of roads leading towards a second parking location is transmitted to the respective navigation terminals.

5. The system of claim 1, wherein at least one navigation terminal of a vehicle is configured as a moving RSU repeatedly transmitting at least the speed of the associated vehicle to the navigation server system on a regular basis.

6. The system of claim 1, wherein the navigation server system distributes the uploaded information layer comprising the extra RSUs to passing one of the GPS positions of RSUs, and to submit data comprising at least the speed of the vehicle when the vehicle is within a defined distance from the RSU.

7. The system of claim 1, wherein each respective navigation terminal is configured to detect when the navigation terminal is approaching or is passing one of the GPS positions of RSUs, and to submit data comprising at least the speed of the vehicle when the vehicle is within a defined distance from the RSU.

8. The system of claim 6, wherein the distributed information layers comprising the extra RSUs are removed after a defined time and are replaced with the initially downloaded information layer.

9. The system of claim 1, wherein the dynamic routing comprises segmenting a selected route from the selected starting point A to the selected destination point B and considering traffic information from the GPS positions of RSUs from the defined number of RSUs as well as from road user define GPS positions of extra RSUs.

10. The system of claim 9, wherein the navigation terminal is configured to calculate each segment of the segmented route one at a time considering traffic situations evolving during the time a vehicle associated with the navigation terminal spent on traveling along previous segments relative to a current segment being calculated.

11. The system of claim 3, where the navigation server system is configured to receive from navigation terminals respective arrival times at the same destination, and the navigation server system is configured to distribute available road capacity between the vehicles according to the respective arrival times.

12. The system of claim 7, wherein respective navigation terminals are configured to request the navigation server system to set up a voice channel between the one navigation terminal requesting the voice channel and a vehicle detected to be approaching or passing one of the RSUs.

13. The system of claim 1, wherein the dynamic routing of a navigation terminal can be switched off and only receive traffic related information from the navigation server system.

14. The system of claim 1, wherein the navigation server system is configured to increase or reduce the defined number of GPS positions of RSUs during certain time periods of a day.

15. The system of claim 1, wherein respective navigation terminals are configured to signal the navigation server system when a respective one of the navigation terminals has reached the selected destination.

* * * * *